Figure 1:
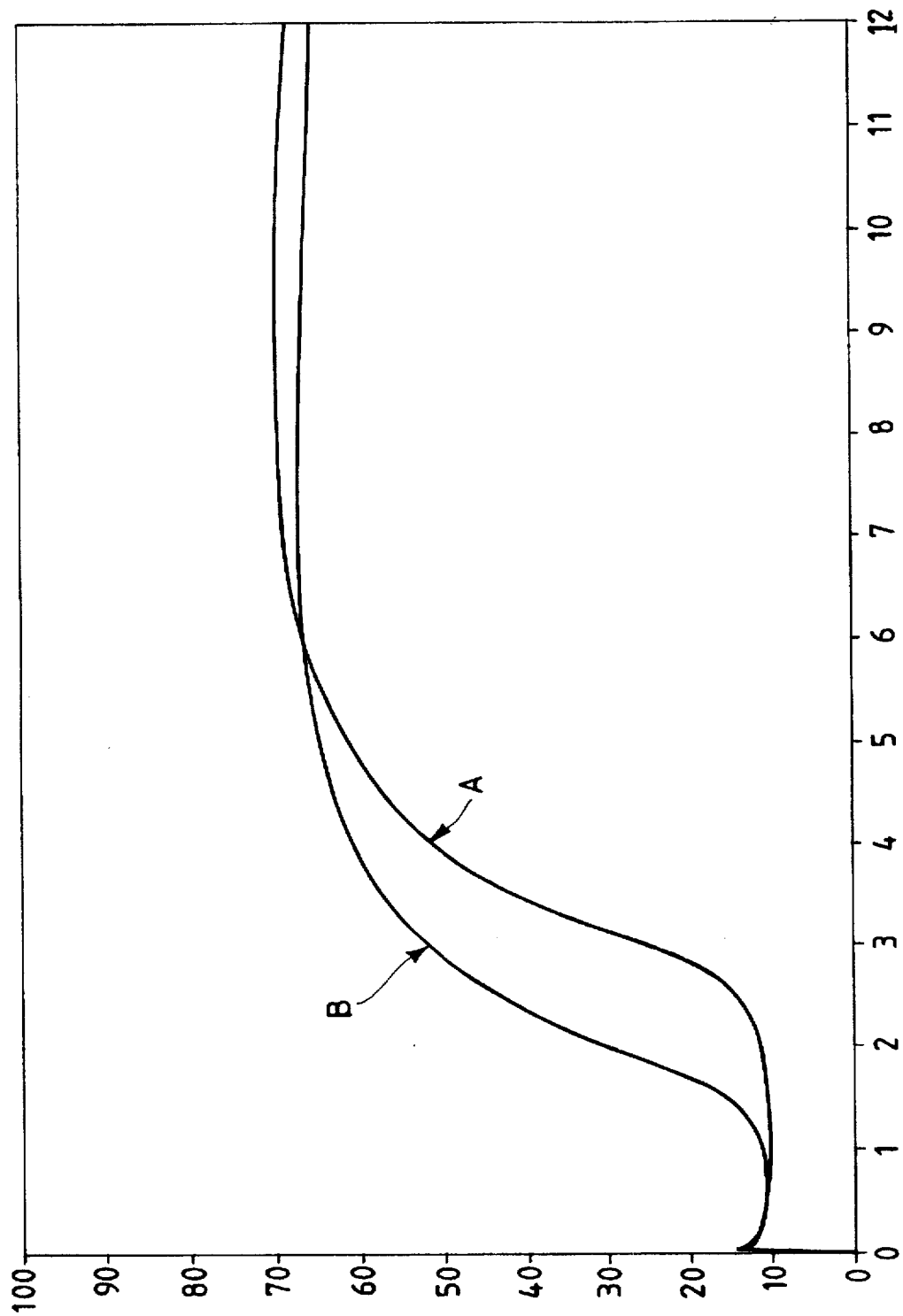

United States Patent
Broussard et al.

[11] Patent Number: 5,747,601
[45] Date of Patent: May 5, 1998

[54] DIHYDROPYRIDINES AS VULCANIZATION ACCELERATORS FOR NATURAL OR SYNTHETIC RUBBERS

[75] Inventors: Fabio Broussard, Brusaporto; Mauro Adovasio; José Roncalli, both of Bergamo, all of Italy

[73] Assignee: Great Lakes Chemical Italia S.r.l., Milan, Italy

[21] Appl. No.: 803,276

[22] Filed: Feb. 20, 1997

[30] Foreign Application Priority Data

Mar. 7, 1996 [IT] Italy ................... MI96A0441

[51] Int. Cl.$^6$ ................... C07D 211/78; C08F 8/32
[52] U.S. Cl. ................... 525/375; 525/326.1; 525/329.7; 525/330.3; 525/331.7; 525/331.8; 525/331.9; 525/343; 525/348; 546/1; 546/314; 546/326; 546/348
[58] Field of Search ................... 546/348, 1, 314, 546/326; 525/326.1, 329.7, 330.3, 331.7, 331.8, 331.9, 343, 348, 375

[56] References Cited

U.S. PATENT DOCUMENTS

| | | | |
|---|---|---|---|
| 2,318,746 | 5/1943 | Bulifant. | |
| 4,209,596 | 6/1980 | Hashimoto | 525/195 |
| 4,636,550 | 1/1987 | Wolff et al. | |
| 4,822,845 | 4/1989 | Graves et al. | 152/564 |
| 5,426,155 | 6/1995 | Hogt et al. | 525/375 |
| 5,486,613 | 1/1996 | Broussard et al. | 546/181 |

FOREIGN PATENT DOCUMENTS 0 634 448  1/1995  European Pat. Off.

*Primary Examiner*—John M. Cooney, Jr.
*Attorney, Agent, or Firm*—Oblon, Spivak, McClelland, Maier & Neustadt, P.C.

[57] ABSTRACT

Vulcanization accelerators constituted by compounds belonging to the class of dihydropyridines having the general formula (I):

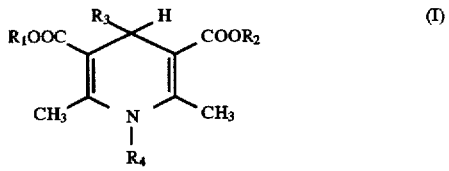

and their use in natural or synthetic rubbers.

16 Claims, 2 Drawing Sheets

DIHYDROPYRIDINES AS VULCANIZATION ACCELERATORS FOR NATURAL OR SYNTHETIC RUBBERS

The present invention relates to vulcanization accelerators constituted by compounds belonging to the class of dihydropyridines.

More particularly, the present invention relates to vulcanization accelerators constituted by compounds belonging to the class of dihydropyridines, to their use in natural or synthetic rubbers and to the manufactured items obtained from the vulcanization of either natural or synthetic rubbers in the presence of said compounds.

It is well-known that the vulcanization of natural or synthetic rubbers takes place by the formation of cross-linkages (i.e., "cross-linking") between the polymeric chains, thanks to the use of either sulfur or peroxides.

The vulcanization process in the presence of sulfur was optimized by using accelerators capable of reducing the vulcanization times and of securing the reproducibility of the results relating to the properties of the manufactured articles.

The known products used as vulcanization accelerators are many; see, for example: Kirk-Othmer: "Enciclopedia of Chemical Technology" Vol. 20, pages 337–364. Among these, may we remind mercaptobenzothiazole and its sulfenamides, dithiocarbamates and thiuram disulfides. In order to obtain good results, such products are often used not as individual products, but as mixtures thereof.

Among the vulcanization accelerators a class of products exists which are defined as "secondary accelerators", useful as activators for primary, thiazole-based accelerators. Example of such products are: N,N'-diphenylguanidine (DPG), N,N'-diortho-toluylguanidine (DOTG), 2,4,6-tris-dimethylaminomethylphenol and the condensation products of aromatic amines with aliphatic aldehydes.

The present Applicant found now that compounds belonging to the class of dihydropyridines, some of which are known from the prior art as light, heat and UV stabilizers for a wide range of polymeric substrates as disclosed, e.g., in U.S. Pat. No. 5,124,456, can be used as vulcanization accelerators.

Therefore, the subject-matter of the present invention are vulcanization accelerators constituted by compounds belonging to the class of dihydropyridines having the general formula (I):

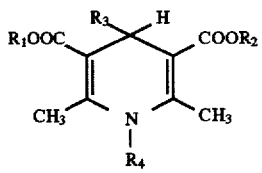

wherein:

$R_1$, $R_2$, $R_3$ and $R_4$, which may be the same, or different from one another, represent a straight or branched $C_1$–$C_{18}$ alkyl radical; a straight or branched $C_2$–$C_{18}$ alkenyl radical; a $C_3$–$C_8$ cycloalkyl radical possibly containing a heteroatom selected from oxygen, nitrogen and sulfur; a $C_7$–$C_{20}$ arylalkyl radical;

or, $R_1$ and $R_2$, which may be the same, or different from each other, represent a moiety having the general formula (II):

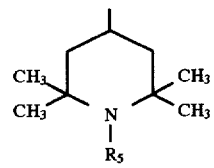

wherein $R_5$ represents a hydrogen atom or a straight or branched $C_1$–$C_{18}$ alkyl radical;

or, $R_3$ and $R_4$, which may be the same, or different from each other, represent a $C_6$–$C_{18}$ aryl radical or a $C_7$–$C_{20}$ alkylaryl radical.

Examples of $C_1$–$C_{18}$ alkyl radicals are methyl, ethyl, propyl, butyl, octyl, and so forth.

Examples of $C_2$–$C_{18}$ alkenyl radicals are propenyl, butenyl, and so forth.

Examples of $C_3$–$C_8$ cycloalkyl radicals are cyclopentyl, cyclohexyl, cycloheptyl, and so forth.

Examples of $C_7$–$C_{20}$ arylalkyl radicals are benzyl, phenylethyl, and so forth.

Examples of $C_6$–$C_{18}$ aryl radicals are phenyl, naphthyl, and so forth.

Examples of $C_7$–$C_{20}$ alkylaryl radicals are toluyl, xylyl, ethylphenyl, and so forth.

The capability of acting as vulcanization accelerators, shown by compounds having the general formula (I) was evidenced by means of the rheometric curves shown in FIGS. 1–2 (wherein on the abscissa and on the ordinate time and torque, respectively, are reported; the meanings of the letters appearing on the rheometric curves will be specified later in the disclosure), as obtained by measuring the stress applied to an oscillating disk embedded inside a rubber sample during the vulcanization step.

The rheometric curves were generated by using Monsanto's Rheometer 100.

The compounds having the general formula (I) can be used combined with other vulcanization accelerators as, e.g., mercapto-benzothiazole sulfenamides.

Figure 2:
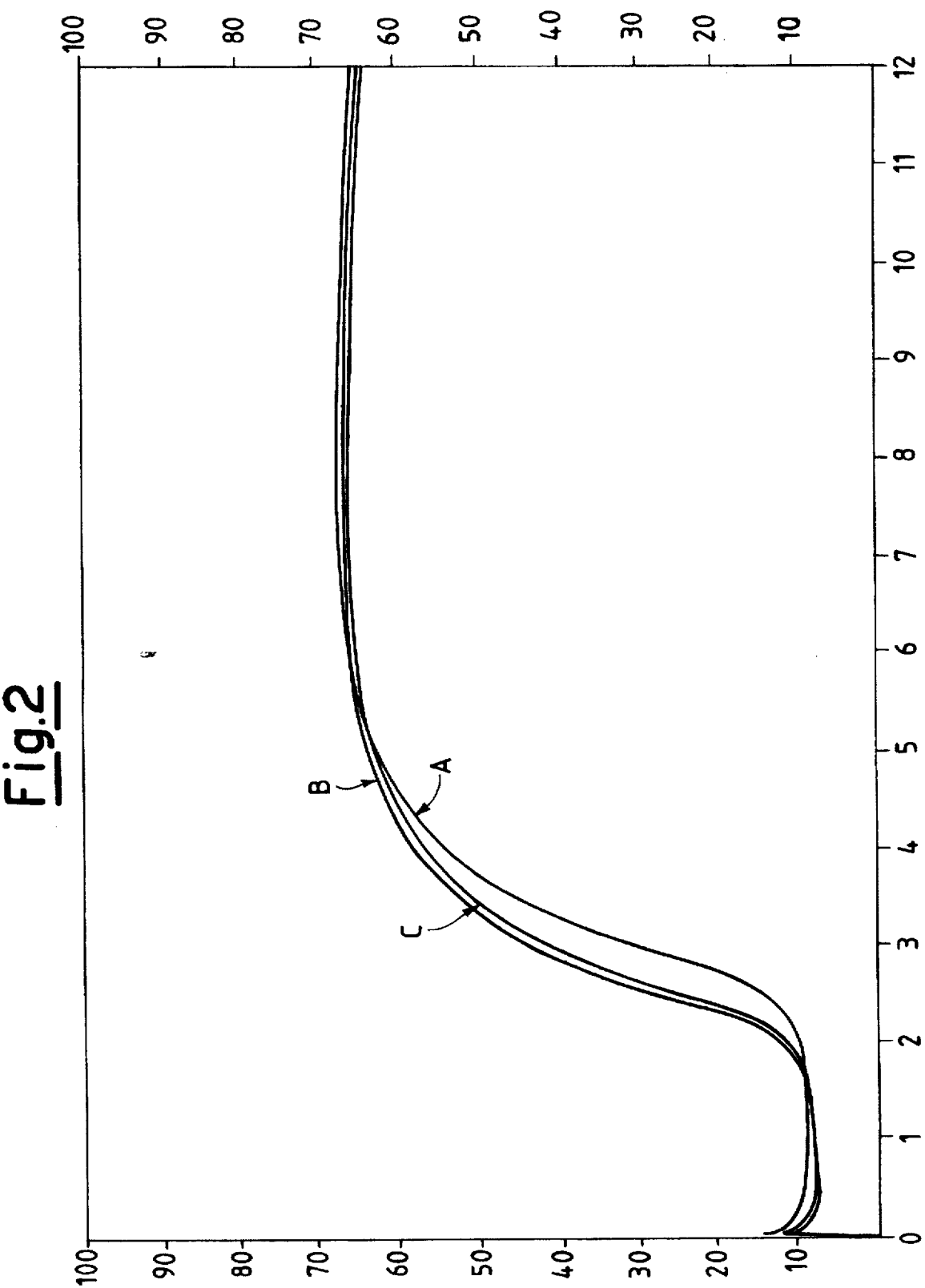

In FIGS. 1 and 2, the rheometric curves are reported which were obtained by using N-cyclohexyl-2-mercapto-benzothiazole sulfenamide (CBS) either alone or in combination with a compound having general formula (I). Such curves show that, when CBS is used together with a compound having general formula (I), the necessary time to reach 90% of vulcanization line maximum peak $t_c(90)$ is considerably shorter thus allowing a faster vulcanization kinetiks than as obtained with CBS alone.

The compounds having the general formula (I) disclosed above either are available from the market, or can be obtained by reducing the corresponding pyridines as described, e.g., in "Chemical Review" (1972), Vol. 72, pages 5–16, or by means of the well-known Hantzsch process described, for example, by L. and M. Fieser in "Organische Chemie" (1975), page 1452, Verlag Chemie Publisher and in "Chemical Review" (1972), Vol. 72, pages 16–21.

When $R_1$ and/or $R_2$ stand for a moiety having the general formula (II), the dihydropyridines according to the present invention can be prepared by means of the following processes:

(A) process comprising reacting ammonia, formaldehyde and a compound having general formula (III):

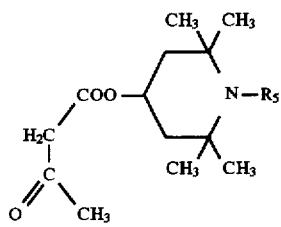

in which $R_5$ has the same meaning as disclosed above. Said process is carried out according to the well-known Hantzsch process described, for example, by L. and M. Fieser in "Organische Chemie" (1975), page 1452, Verlag Chemie Publisher and in "Chemical Review" (1972), Vol. 72, pages 16–21, or according to that process as disclosed in U.S. Pat. No. 5,124,456;

(B) process comprising the transesterification reaction of 1 mole of 3,5-diethyl-dicarboxylato-2,6-dimethyl-1,4-dihydropyridine having the formula:

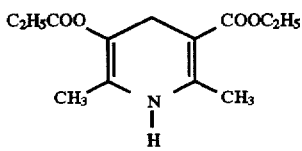

with 2 moles of 4-hydroxy-2,2,6,6-tetramethylpiperidine having the formula:

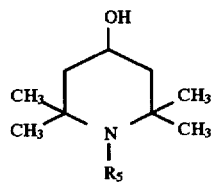

in which $R_5$ has the same meaning as defined above.

The above said reaction is carried out in the presence of a transesterification catalyst such as, e.g., sodium amide ($NaNH_2$), and an organic solvent, preferably a hydrocarbon, in particular xylene.

The vulcanization accelerators having the general formula (I) can be used in both natural and synthetic rubbers such as, e.g., SBR, NBR, BR, EPDM, and so forth.

In order to better understand the present invention and to practice it, hereinunder some illustrative examples are reported, which, however, in no way shall be regarded as being limitative of the scope of the same invention.

EXAMPLE 1

Preparation of 1,4-dihydro-2,6-dimethylpyridine-3,5-dicarboxy-di-[4-(2,2,6,6-tetramethyl piperidine)] (Compound No. 2) having the formula:

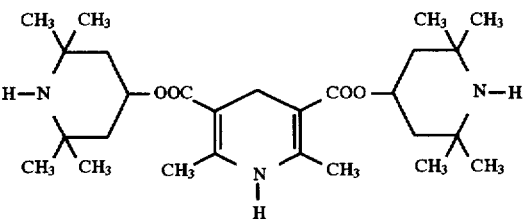

To a 4-necked reactor of 0.5 liter of capacity, equipped with mechanical stirrer, thermometer and condenser, there are charged 5 g (0.0198 mole) of 2,6-dimethyl-3,5-dicarboxy-diethylester-1,4-dihydropyridine, 65 g (0.0414 mole) of 4-hydroxy-2,2,6,6-tetramethyl-piperidine, 100 ml of xylene and 0.3 g of sodium amide.

The reaction mixture is heated up to refluxing temperature and xylene is distilled off until ethyl alcohol, which is separated during the course of the reaction, is no longer present in the distillate.

When the reaction has gone to completeness, the insoluble matter formed from sodium amide is filtered off while hot, and the product is cristallized by cooling it down to room temperature. After filtering, washing with xylene and drying, 8.5 g is obtained of a yellow cristalline product (yield 85%) corresponding to 1,4-dihydro-2,6-dimethylpyridine-3,5-dicarboxy-di-[4-(2,2,6,6-tetramethylpiperidine)] (Compound No. 2). The NMR spectrum comfirms the structure.

EXAMPLE 2

Preparation of 1,4-dihydro-2,6-dimethylpyridine-3,5-dicarboxy-di-[4-(2,2,6,6-tetramethyl-N methyl-piperidine)] (Compound No. 3) having the formula:

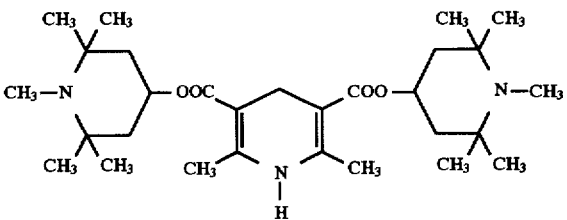

1,4-Dihydro-2,6-dimethylpyridine-3,5-dicarboxy-di-[4-(2,2,6,6-tetramethyl-N-methyl-piperidine)] (Compound No. 3) is prepared analogously to Example 1.

EXAMPLES 3–7

Examples 3–7 illustrate the behaviour of compounds having general formula (I) in combination with N-cyclohexyl-2-mercaptobenzothiazole sulfenamide (CBS).

Natural rubber based compounds were prepared, the components of which are reported in following Table 1.

Compound No. 1 is a commercial product ex Aldrich, which is 2,6-dimethyl-3,5-dicarboxy-diethylester-1,4-dihydropyridine having the formula:

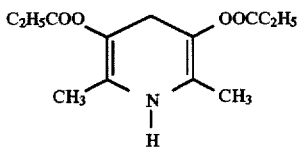

TABLE 1

| COMPONENTS | % BY WEIGHT* |
| --- | --- |
| Natural rubber SMR 10 | 100.00 |
| Zinc oxide | 5.00 |
| Stearine | 1.00 |
| Highly aromatic oil | 5.00 |
| Carbon black N 375 | 45.00 |
| Sulfur | 2.00 |
| CBS | 0.80 |
| Compound of formula (I)** | 0.50 |

*: % by weight based on rubber
**: Compound Nos. 1–3.

Monsanto's Rheometer is used according to the following operating settings:

oscillation arc: ±1°;

temperature: 150° C.

From the resulting rheometric curves shown in FIGS. 1–2, the $t_c(90)$ values were calculated and are reported in Tables 2 and 3. The rheometric curves shown in FIGS. 1 and 2 clearly show the effectiveness of the compounds having the general formula (I) as vulcanization accelerators. Such an effectiveness is also demonstrated by the $t_c(90)$ values reported in Tables 2 and 3, from which one will see that the $t_c(90)$ values of the rubber compounds containing CBS and the compounds with general formula (I) are always lower than the $t_c(90)$ values of the compounds containing only CBS.

In FIG. 1, the rheometric curves are reported which relate to CBS alone and with Compound No. 1.

FIG. 2, the rheometric curves are reported which relate to CBS alone and with Compound Nos. 2 and 3.

The letters appearing near the rheometric curves in FIG. 1 relate to the following compounds:

(A): CBS alone;

(B) CBS with Compound No. 1.

The letters appearing near the rheometric curves in FIG. 2 relate to the following compounds:

(A): CBS alone;

(B): CBS with Compound No. 2;

(C): CBS with Compound No. 3.

TABLE 2

| EXAMPLE No. | DIHYDROPYRIDINE | $t_c(90)$ |
| --- | --- | --- |
| 3 | none | 10.36 |
| 4 | Compound No. 1 | 8.24 |

TABLE 3

| EXAMPLE No. | DIHYDROPYRIDINE | $t_c(90)$ |
| --- | --- | --- |
| 5 | none | 9.36 |
| 6 | Compound No. 2 | 8.36 |
| 7 | Compound No. 3 | 9.00 |

We claim:

1. A vulcanization accelerator of the formula (I):

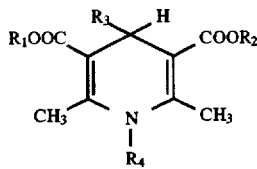

wherein:

$R_1$ and $R_2$, are each independently a straight or branched $C_1$–$C_{18}$ alkyl radical; a straight or branched $C_2$–$C_{18}$ alkenyl radical; a $C_3$–$C_8$ cycloalkyl radical; a $C_7$–$C_{20}$ arylalkyl radical; or a moiety having the formula (II):

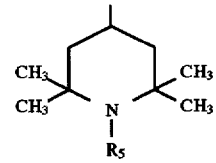

wherein $R_5$ represents a hydrogen atom or a straight or branched $C_1$–$C_{18}$ alkyl radical; and $R_3$ and $R_4$, are each independently a straight or branched $C_1$–$C_{18}$ alkyl radical; a straight or branched $C_2$–$C_{18}$ alkenyl radical; a $C_7$–$C_{20}$ arylalkyl radical; a $C_3$–$C_8$ cycloalkyl radical; or a $C_6$–$C_{18}$ aryl radical.

2. Vulcanization accelerators according to claim 1, wherein the $C_1$–$C_{18}$ alkyl radicals are methyl, ethyl, propyl, butyl, octyl.

3. Vulcanization accelerators according to claim 1, wherein the $C_2$–$C_{18}$ alkenyl radicals are propenyl, butenyl.

4. Vulcanization accelerators according to claim 1, wherein the $C_3$–$C_8$ cycloalkyl radicals are cyclopentyl, cyclohexyl, cycloheptyl.

5. Vulcanization accelerators according to claim 1, wherein the $C_7$–$C_{20}$ arylalkyl radicals are benzyl, phenylethyl.

6. Vulcanization accelerators according to claim 1, wherein the $C_6$–$C_{18}$ aryl radicals are phenyl, naphthyl.

7. Vulcanization accelerators according to claim 1, in which the $C_7$–$C_{20}$ alkylaryl radicals are toluyl, xylyl, ethylphenyl.

8. A method for vulcanizing rubber, comprising heating a composition comprising (1) a rubber selected from the group consisting of a natural and a synthetic rubber and (2) a vulcanization accelerator according to claim 1.

9. The method of claim 8, wherein said rubber is a synthetic rubber selected from the group comprising of SBR, NBR, BR or EPDM.

10. The method of claim 8, wherein said composition further comprises an additional vulcanization accelerator.

11. The method of claim 10, wherein said additional vulcanization accelerator is mercapto-benzothiazole sulfenamide.

12. The vulcanization accelerator of claim 1, wherein $R_1$ contains a heteroatom selected from oxygen, nitrogen or sulfur.

13. The vulcanization accelerator of claim 1, wherein $R_2$ contains a heteroatom selected from oxygen, nitrogen or sulfur.

14. The vulcanization accelerator of claim 1, wherein $R_3$ contains a heteroatom selected from oxygen, nitrogen or sulfur.

15. The vulcanization accelerator of claim 1, wherein $R_4$ contains a heteroatom selected from oxygen, nitrogen or sulfur.

16. Manufactured articles obtained from the vulcanization of natural or synthetic rubbers in the presence of the vulcanization accelerators according to any one of claims 1–7.

* * * * *